United States Patent
Claussen

(10) Patent No.: US 10,316,735 B2
(45) Date of Patent: Jun. 11, 2019

(54) METHOD AND APPARATUS FOR INDICATING A RISK OF CORROSION OR SCUFFING OF COMPONENTS OF A COMBUSTION CHAMBER OF A TURBOCHARGED ENGINE ARRANGEMENT, IN PARTICULAR FOR VESSELS, AND TURBOCHARGED ENGINE ARRANGEMENT FOR VESSELS

(71) Applicant: Stefan Claussen, Hamburg (DE)

(72) Inventor: Stefan Claussen, Hamburg (DE)

( * ) Notice: Subject to any disclaimer, the term of this patent is extended or adjusted under 35 U.S.C. 154(b) by 373 days.

(21) Appl. No.: 15/101,645

(22) PCT Filed: Dec. 2, 2014

(86) PCT No.: PCT/EP2014/076261
§ 371 (c)(1),
(2) Date: Jun. 3, 2016

(87) PCT Pub. No.: WO2015/082473
PCT Pub. Date: Jun. 11, 2015

(65) Prior Publication Data
US 2016/0305310 A1    Oct. 20, 2016

(30) Foreign Application Priority Data

Dec. 4, 2013  (EP) ..................... 13195758

(51) Int. Cl.
*F02B 29/04*    (2006.01)
*F02M 35/10*    (2006.01)
*F02M 35/16*    (2006.01)
*F02B 77/08*    (2006.01)

(52) U.S. Cl.
CPC ...... *F02B 29/0406* (2013.01); *F02B 29/0468* (2013.01); *F02B 29/0493* (2013.01); *F02M 35/1019* (2013.01); *F02M 35/1038* (2013.01); *F02M 35/10157* (2013.01); *F02M 35/165* (2013.01); *F02B 77/083* (2013.01); *Y02T 10/144* (2013.01); *Y02T 10/146* (2013.01)

(58) Field of Classification Search
CPC .. F02B 29/0468; F02B 29/0406; F02B 29/04; F02B 29/0493
USPC ................................................ 60/605.1, 599
See application file for complete search history.

(56) References Cited

FOREIGN PATENT DOCUMENTS

| DE | 19911251 A1 | 9/2000 |
|---|---|---|
| EP | 2278134 A1 | 1/2011 |
| JP | S59141718 A | 8/1984 |
| JP | H08177489 A | 7/1996 |
| JP | 2003013765 A | 1/2003 |

*Primary Examiner* — Ngoc T Nguyen
(74) *Attorney, Agent, or Firm* — Grogan, Tuccillo & Vanderleeden, LLP

(57) ABSTRACT

In order to provide a method for indicating a risk of corrosion or scuffing of components of a combustion chamber of a turbo charged engine arrangement, in particular for vessels, the turbo charged engine arrangement includes a turbocharger and a charge gas cooler. A first gas stream of an ambient gas enters into the turbocharger, a second gas stream of charge gas flows from the turbocharger to the charge gas cooler, and the second gas stream of charge gas enters into the charge gas cooler. A third gas stream of charge gas flows from the charge gas cooler to the combustion chamber, and the third gas stream of the charge gas enters into the combustion chamber.

12 Claims, 4 Drawing Sheets

METHOD AND APPARATUS FOR INDICATING A RISK OF CORROSION OR SCUFFING OF COMPONENTS OF A COMBUSTION CHAMBER OF A TURBOCHARGED ENGINE ARRANGEMENT, IN PARTICULAR FOR VESSELS, AND TURBOCHARGED ENGINE ARRANGEMENT FOR VESSELS

CROSS-REFERENCE TO RELATED APPLICATIONS

This application is entitled to the benefit of and incorporates by reference in its entirety essential subject matter disclosed in International Application No. PCT/EP2014/076261, filed on Feb. 12, 2014.

FIELD OF THE INVENTION

The present invention relates to a method for indicating a risk of corrosion or scuffing of components of a combustion chamber of a turbocharged engine arrangement, in particular for vessels. Furthermore, the present invention relates to an apparatus for indicating a risk of corrosion or scuffing of components of a combustion chamber of a turbocharged engine arrangement, in particular for vessels. Further, the invention relates to a turbocharged engine arrangement comprising an apparatus for indicating a risk of corrosion or scuffing of components of a combustion chamber.

BACKGROUND OF THE INVENTION

Turbocharged engines, in particular turbocharged two-stroke engines, are commonly used in marine vessels for propulsion. Turbocharged two-stroke engines for marine vessels are furthermore usually configured as diesel engines, also known as compression-ignition engines. In a two-stroke diesel engine fuel is injected after air is compressed in the combustion chamber, causing the fuel to self-ignite. However, it is also possible that a fuel air mixture is injected into the combustion chamber and compressed until the fuel air mixture self-ignites.

After the expansion of the ignited fuel or air fuel mixture a scavenge gas, in particular scavenge air, is injected into the combustion chamber. The scavenge gas can be injected into the combustion chamber via the air inlet port or the air fuel mixture inlet port of the combustion chamber, respectively, or via a separate scavenge port. For scavenging, two-stroke diesel engines require a mechanically driven blower or a turbocharger to charge the cylinder. In a turbocharger a gas, in particular air, is compressed. Due to the compression the temperature of the gas is increased. However, an increased temperature of scavenging gas or charge gas, respectively, decreases the efficiency of the turbocharged two-stroke engines. Therefore, the compressed gas is subsequently cooled down in a charge gas cooler, in particular a charge air cooler. Charge gas coolers are also known as intercoolers. The compressed, pressurized and cooled down charge gas is then injected into the combustion chamber of the two-stroke diesel engine to scavenge the combustion chamber and to provide the gas, in particular air, to charge the combustion chamber for the next compression and ignition cycle.

However, as the temperature of the charge gas decreases in the charge gas cooler, the relative water content or humidity of the charge gas increases and may increase to a level where the humidity reaches saturation. Water may then condense out of the charge gas and pool in a scavenge gas duct or charge gas duct, respectively. Depending on the efficiency of the water catcher of the engine and the pressure of the scavenge gas or charge gas, the water condensate may be dragged with the flow of scavenge gas or charge gas into the combustion chamber and increase the risk of corrosion of components of the combustion chamber or even disturb the oil film between piston ring and liner and may lead to abrasive wear or scuffing.

For a diesel two-stroke engine in slow steaming mode it would be optimal to keep the temperature of the charge gas or scavenge gas as low as possible so that a maximal amount of water condenses out of the charge gas because in slow steaming mode the water catcher can operate more efficiently. However, in full load mode the mass flow rate of charge gas is very high and, thus, the risk that water condensate is dragged into the combustion chamber increases. With the increased risk of water entering the combustion chamber the risk of scuffing and corrosion of components of the combustion chamber increases as well. Therefore, in prior art, a higher charge gas temperature is chosen to reduce the mass flow rate of the charge gas and to reduce the risk of water condensate being dragged into the combustion chamber.

An apparatus for controlling the charge air temperature of an internal combustion machine is disclosed in EP 0 508 068 A1. The dew temperature of the charge air is determined from measured values of the humidity and the temperature of the charge air and by raising the charge air temperature the condensation of water vapor in the charge air is prevented.

The present invention is based on the finding that contrary to the assumptions in prior art a higher charge gas temperature does not decrease the mass flow rate of water into the combustion chamber because due to the higher charge gas temperature more water gets into the combustion chamber in form of water vapor. Furthermore, the present invention takes also into account that almost the same amount of water is generated in the combustion process as is injected into the combustion chamber via the charge air or scavenge air.

BRIEF SUMMARY OF THE INVENTION

It is the object of the present invention to provide a method for indicating a risk of corrosion or scuffing of components of a combustion chamber of a turbocharged engine arrangement, in particular for vessels, and to provide an apparatus for conducting said method.

The present invention provides a method for indicating a risk of corrosion or scuffing of components of a combustion chamber of a turbocharged engine arrangement, in particular for vessels, wherein the turbocharged engine arrangement comprises a turbocharger and a charge gas cooler, wherein a first gas stream of an ambient gas enters into the turbocharger, wherein a second gas stream of charge gas flows from the turbocharger to the charge gas cooler, wherein the second gas stream of charge gas enters into the charge gas cooler, wherein a third gas stream of charge gas flows from the charge gas cooler to the combustion chamber, and wherein the third gas stream of charge gas enters into the combustion chamber, comprising the steps of a) measuring parameters, wherein the measured parameters comprise at least one gas temperature, at least one gas pressure, a first water content of the charge gas of the third gas stream and a liner temperature of a liner of the combustion chamber, and b) determining, in particular calculating, a second water content of a gas in the combustion chamber based on the measured parameters, and c1) indicating the determined second water content as an indicator of the risk of corrosion or scuffing of components of the combustion chamber, and/or c2) comparing the determined second water content with at least one pre-determined value and indicating the risk of corrosion or scuffing of components of the combustion chamber when the determined secondwater content is higher and/or equal and/or lower than the at least one predetermined value, and/or c3) adjusting an operating parameter of the turbocharged engine.

In the context of the invention the terms "humidity" and "relative water content" are used interchangeable. Further, the term "water content" may refer to "absolute water content" or "relative water content".

In the method according to the invention a first water content of the charge gas of the third gas stream is measured. In other words, the water content or relative water content or humidity of the charge gas flowing from the charge gas cooler to the combustion chamber, i.e. in between the charge gas cooler and the combustion chamber, is measured. With the measurement of the first water content of the third gas stream it is advantageously possible to reliably, in particular substantially precisely, determine the water content or the relative water content or the humidity of the charge gas before entering the combustion chamber, in particular at the gas inlet port or scavenge port of the combustion chamber. The determination of the first water content or humidity of the third gas stream is in particular advantageous because water vapor of the third gas stream, which has been cooled down by a charge gas cooler, also known as intercooler, may condense and it cannot be precisely predicted how much of the condensed water can be drained, for example by a water catcher. Hence, although it is in principle possible to calculate the humidity or water content of the charge gas entering the combustion chamber based on the performance figures of the turbocharger and the charge gas cooler and, for example, the ambient temperature, pressure and humidity of the ambient gas entering the turbocharger, that calculation is subject to large uncertainties because it cannot be reliably predicted how much water is actually drained. In particular, it has been found by the applicant that it is not very reliable to calculate the water content of the charge gas entering the combustion chamber, the amount of water condensate generated by cooling down the charge gas and the amount of water condensate being dragged into the combustion chamber with the stream of the charge gas. Therefore, it is convenient to measure the first water content or the humidity of the third gas stream of charge gas between the charge gas cooler and the combustion chamber.

Furthermore, the present invention proposes to measure a liner temperature of a liner of the combustion chamber. The humidity in the combustion chamber in the immediate adjacency of a liner internal surface at the prevailing pressure is a measure for the risk of condensation of water on the liner internal surface, wherein said condensation in turn is related to the risk of corrosion or scuffing of the components of the liner and the combustion chamber. Here, it is taken advantage of the realization that although the humidity is not uniform in the combustion chamber since the temperature is considerably higher close to the exhaust port of the combustion chamber than in the proximity of the liner internal surface, the condensation only depends on the liner temperature, in particular the liner surface temperature, and the prevailing cylinder pressure. Thus, by measuring the liner temperature the amount of water condensing on the liner internal surface and therefore the risk of corrosion or scuffing of components of the combustion chamber can be reliably determined. It has been found by the applicant that although in principle the liner temperature of the liner of the combustion chamber could be calculated using the performance figures of the engine, i.e. the torque, the number of revolutions, the efficiency and the cooling power of a cooling system of the cylinders, such a calculated liner temperature of the liner of the combustion chamber is subject to high uncertainties. Therefore, it is advantageous to measure the liner temperature.

By measuring at least one gas temperature and at least one gas pressure and a first water content of a charge gas of the third gas stream and a liner temperature of the liner of the combustion chamber the second water content or humidity of a gas in the combustion chamber, in particular of gas in the combustion chamber adjacent to the liner internal surface, can be determined. Advantageously, the determination of the second water content is done by calculation using known thermodynamic relations. However, it is also possible to use a table that relates the measured parameters with the second water content or humidity of a gas in the combustion chamber adjacent to the liner internal surface. The at least one gas temperature and the at least one gas pressure may, for example, be measured in the third gas stream of charge gas flowing from the charge gas cooler to the combustion chamber. However, it is also possible to measure the at least one gas temperature and/or the at least one gas pressure in the first and/or second gas stream of ambient gas or charge gas.

According to the invention, the determined second water content is indicated as an indicator of the risk of corrosion or scuffing of components of the combustion chamber. For example, the determined second water content may be indicated visually or acoustically to an operator or to an operating person operating the turbocharged engine arrangement. Thus, the operator or operating person advantageously can use the information of the determined second water content to adjust operating parameters of the turbocharged engine in order to reduce the risk of corrosion or scuffing of components of the combustion chamber. Alternatively or simultaneously, according to the invention the determined second water content can be compared with at least one predetermined value and the risk of corrosion or scuffing of components of the combustion chamber is indicated when the determined second water content is higher and/or equal and/or lower than the at least one predetermined value. The risk of corrosion or scuffing of components of the combustion chamber may be indicated visually or acoustically and an operator or an operating person in charge of the turbocharged engine arrangement may use the information to adjust operating parameters of the turbocharged engine arrangement in order to reduce the risk of corrosion or scuffing of components of the combustion chamber.

Furthermore, alternatively or simultaneously according to the method of the present invention an operating parameter of the turbocharged engine may be adjusted. For example, the adjustment could be done manually by an operator or an operating person, or the adjustment of an operating parameter of the turbocharged engine may be performed automatically. Thus, with the method of the present invention the risk of corrosion or scuffing of components of a combustion chamber may be indicated and/or reduced.

Preferably, the operating parameter of the turbocharged engine may be adjusted based on the determined second water content and/or based on the comparison of the determined second water content with the at least one predetermined value.

The method according to the invention can be preferably used in turbocharged two-stroke engine arrangements. However, the method may also be used in turbocharged four-stroke engine arrangements.

In a preferred embodiment of the present invention, the at least one temperature is a temperature of the first gas stream of ambient gas and/or a temperature of the second gas stream of charge gas and/or a temperature of the third gas stream of charge gas, and/or the at least one gas pressure is a pressure of the first gas stream of ambient gas and/or a pressure of the second gas stream of charge gas and/or a pressure of the third gas stream of charge gas and/or a pressure of the gas in the combustion chamber.

Expediently, the at least one temperature is one of said temperatures and the at least one gas pressure is one of said pressures. In an advantageous manner the at least one temperature and the at least one gas pressure can be employed in combination with the first water content of the charge gas of the third gas stream and the liner temperature of the liner of the combustion chamber to determine or calculate the second water content or humidity in the combustion chamber adjacent to the liner internal surface. For example, the at least one temperature may be the temperature of the third gas stream, i.e. the temperature of the charge gas flowing from the charge gas cooler to the combustion chamber. Furthermore, the at least one gas pressure may be the gas pressure of the charge gas flowing from the charge gas cooler to the combustion chamber. Therefore, in this case, the second water content or humidity in the combustion chamber adjacent to the liner surface can be calculated based on the at least one temperature, the liner temperature, the at least one gas pressure, and the first water content, wherein the at least one temperature, the at least one gas pressure and the first water content are measured in the third gas stream of charge gas flowing from the charge gas cooler to the combustion chamber. In this case, it is advantageous that the second water content in the combustion chamber can be calculated without substantial uncertainties based on the performance figures of the engine, in particular the compression ratio of the engine. However, in principle it is also possible to measure the at least one temperature and/or the at least one gas pressure in the first gas stream of ambient gas and/or in the second gas stream of charge gas, i.e. the ambient temperature and/or pressure of the gas entering the turbocharger or the temperature and/or pressure of the gas flowing from the turbocharger to the charge gas cooler, and use the performance figures of the turbocharger and/or the charge gas cooler to calculate the second water content or humidity in the combustion chamber adjacent to the liner of the combustion chamber.

In a further preferred embodiment of the invention it is provided to measure one or more of the temperatures of the first gas stream of ambient air, of the second gas stream of charge gas and of the third gas stream of charge gas and to measure one or more of the pressures of the first gas stream of ambient gas, of the second gas stream of charge gas and of third gas stream of charge gas and of the pressure of the gas in the combustion chamber. Furthermore, the at least one temperature and the at least one pressure can advantageously be measured at or in the turbocharger and/or at or in the charge gas cooler. Expediently, the additional measurements of temperatures and pressures may be used to calculate or determine the second water content or humidity in the combustion chamber more precisely and/or to cross-check thermodynamical calculations with measured values.

In a further preferred embodiment, the ambient gas of the first gas stream is ambient air, and/or the charge gas of the second gas stream is charge air and/or the charge gas of the third gas stream is charge air and/or the gas in the combustion chamber is a charge gas, in particular charge air, or a gas fuel mixture, in particular an air fuel mixture. Further advantageously, the ambient air may be engine room air. The ambient air may also be referred to as intake air.

In a further preferred embodiment of the present invention, a third water content of a gas is measured, wherein the third water content is a water content of the first gas stream of ambient gas and/or a water content of the second gas stream of charge gas. Furthermore, the third water content may be measured for the gas in the turbocharger and/or in the charge gas cooler.

In the embodiment the additional measurement of a third water content of a gas can be used to determine or calculate the second water content or humidity in the combustion chamber more precisely or to cross-check the thermodynamic calculations with measured values. When the ambient gas is an engine room air, the third water content of a gas may be the water content or humidity of the engine room air.

In a further preferred embodiment, the present invention proposes that the operating parameter of the turbocharged engine arrangement is the liner temperature of the liner, and/or the temperature of the third gas stream of charge gas, and/or a lubrication rate of the components of the combustion chamber with a lubricant, and/or the alkalinity of the lubricant, and/or the charge gas pressure of the turbocharger, also known as boost pressure.

Expediently, the liner temperature of the liner may be increased automatically or by an operator or operating person. It is advantageous to increase the liner temperature and, therefore, to decrease a relative water content or humidity adjacent to the liner surface. Thus, by decreasing the relative water content or humidity adjacent to the liner surface the risk of water condensing on the liner surface is decreased and therefore the risk of corrosion or scuffing of components of the combustion chamber is decreased as well.

Furthermore, it can be advantageous to lower the temperature of the third gas stream of charge gas, i.e. to lower the temperature of the charge gas flowing from the charge gas cooler to the combustion chamber in order to increase the relative water content or humidity to saturation level so that condensation of water vapor in the charge gas is initiated or starts. In other words, the temperature of the charge gas of the third gas stream is lowered below the dew temperature and the humidity or water content of the third gas stream of charge gas condenses out of the charge gas. Thus, the amount of water entering the combustion chamber in form of water vapor is reduced.

Furthermore, in the preferred embodiment the lubrication rate of the components of the combustion chamber with a lubricant may be increased. Water as liquid or vapor entering the combustion chamber and water vapor condensating on the liner internal surface or water generated during the combustion of the air fuel mixture and condensing on the liner internal surface reacts with combustion products and the lubricant in the combustion chamber or disturb the oil film between piston ring and liner. In the reaction acidic fluids can be produced. Thus, an increase of the lubrication rate of the components of the combustion chamber with a lubricant increases the rate at which the lubricant is replaced and therefore reduces the corrosive effects of the acids on the components of the combustion chamber or forms a thicker oil film to reduce risk of scuffing caused by liquid water disturbing the oil film. Furthermore, it can be advantageous to increase the alkalinity of the lubricant and to increase the neutralization capacity of the lubricant.

In a further preferred embodiment of the present invention, the liner temperature is adjusted by adjusting the temperature of cooling fluid of a liner cooling system.

Advantageously, the liner temperature can be adjusted with a high reliability by adjusting the temperature of cooling fluid of the liner cooling system.

In a further preferred embodiment of the present invention, an increased risk of corrosion or scuffing of components of the combustion chamber is indicated when the humidity $\varphi_2$ in the combustion chamber exceeds a pre-determined value of 50%, preferably 60%, more preferably 75%. Furthermore, in a preferred embodiment the risk of corrosion or scuffing of components of the combustion chamber is indicated as being low when the humidity $\varphi_2$ or the second water content in the combustion chamber falls below a pre-determined value of 60%, more preferably 55%, especially preferably below 50%. The pre-determined value is preferably set depending on the engine design, the speed of the engine (rpm) and time, in particular the typical time scale of the reaction processes.

It has been found by the applicant that the risk of corrosion or scuffing of the combustion chamber components is increased when the humidity $\varphi_2$ in the combustion chamber exceeds 50%, preferably 60%, more preferably 75%.

In an even further preferred embodiment of the present invention, the risk of corrosion or scuffing of components of the combustion chamber may be indicated by a visual indicator, for example, a light or a series of color-coded lights, a graphical display, or a text projected on a screen or shown on a display. However, the risk of corrosion or scuffing of components of the combustion chamber may also be indicated by any suited means, for example, by an audible signal transmitted over a speaker system.

The object of the present invention is furthermore solved by the provision of an apparatus for indicating a risk of corrosion or scuffing of components of a combustion chamber of a turbocharged engine arrangement, in particular for vessels, wherein the turbocharged engine arrangement comprises a turbocharger and a charge gas cooler, said apparatus comprising a processing unit and at least one sensor for measuring parameters, said parameters comprising a first water content of a charge gas of a third gas stream flowing from the charge gas cooler to the combustion chamber, at least one gas temperature and at least one gas pressure, characterized in that the at least one sensor comprises a sensor for measuring a liner temperature of a liner of the combustion chamber, the processing unit is configured for determining, in particular calculating, a second water content of a gas in the combustion chamber based on the parameters measured by the at least one sensor and/or the processing unit is configured for comparing the determined second water content with at least one predetermined value, the apparatus comprises notification means for indicating the determined second water content as an indicator for the risk of corrosion or scuffing of components of the combustion chamber and/or for indicating the risk of corrosion or scuffing of components of the combustion chamber when the determined second water content is higher and/or equal and/or lower than the at least one predetermined value, and/or the apparatus comprises adjusting means for adjusting an operating parameter of the turbocharged engine arrangement.

Advantageously, the second water content or humidity and/or the risk of corrosion or scuffing of components of the combustion chamber is indicated so that an operator or an operating person operating the charged engine arrangement can take precautions in order to reduce the risk of corrosion or scuffing of the components of the combustion chamber. Furthermore, it is advantageously possible to automatically adjust an operating parameter of the turbocharged engine by the adjusting means.

In a further preferred embodiment the at least one temperature is a temperature of a first gas stream of ambient gas entering the turbocharger and/or a temperature of a second gas stream of charge gas flowing from the turbocharger to the charge gas cooler and/or a temperature of the third gas stream of charge gas, and/or the at least one gas pressure is a pressure of the first gas stream of ambient gas and/or a pressure of the second gas stream of charge gas and/or a pressure of the third gas stream of charge gas and/or a pressure of the gas in the combustion chamber.

In an even further preferred embodiment the ambient gas of the first gas stream is ambient air and/or the charge gas of the second gas stream is charge air and/or the charge gas of the third gas stream is charge air and/or the gas in the combustion chamber is a charge gas, in particular charge air or a gas fuel mixture, in particular an air fuel mixture.

In a further preferred embodiment of the apparatus the adjusting means are configured to adjust the liner temperature and/or the temperature of the third gas stream of charge gas and/or a lubrication rate of the components of the combustion chamber with a lubricant, and/or the alkalinity of the lubricant and/or the charge gas pressure of the turbocharger, also known as boost pressure.

In another preferred embodiment of the apparatus the apparatus comprises a liner cooling system, wherein the adjusting means are configured for adjusting the temperature of cooling fluid of the liner cooling system.

In a further preferred embodiment the notification means may be configured as a display, and/or a monitor and/or color-coded light emitters, and/or a sound emitter.

A further solution to the object of the invention is provided by a turbocharged engine arrangement comprising an apparatus as described above.

BRIEF DESCRIPTION OF THE DRAWINGS

A preferred embodiment of the invention is shown in the drawings.

DETAILED DESCRIPTION OF THE PREFERRED EMBODIMENT OF THE INVENTION

Figure 1:
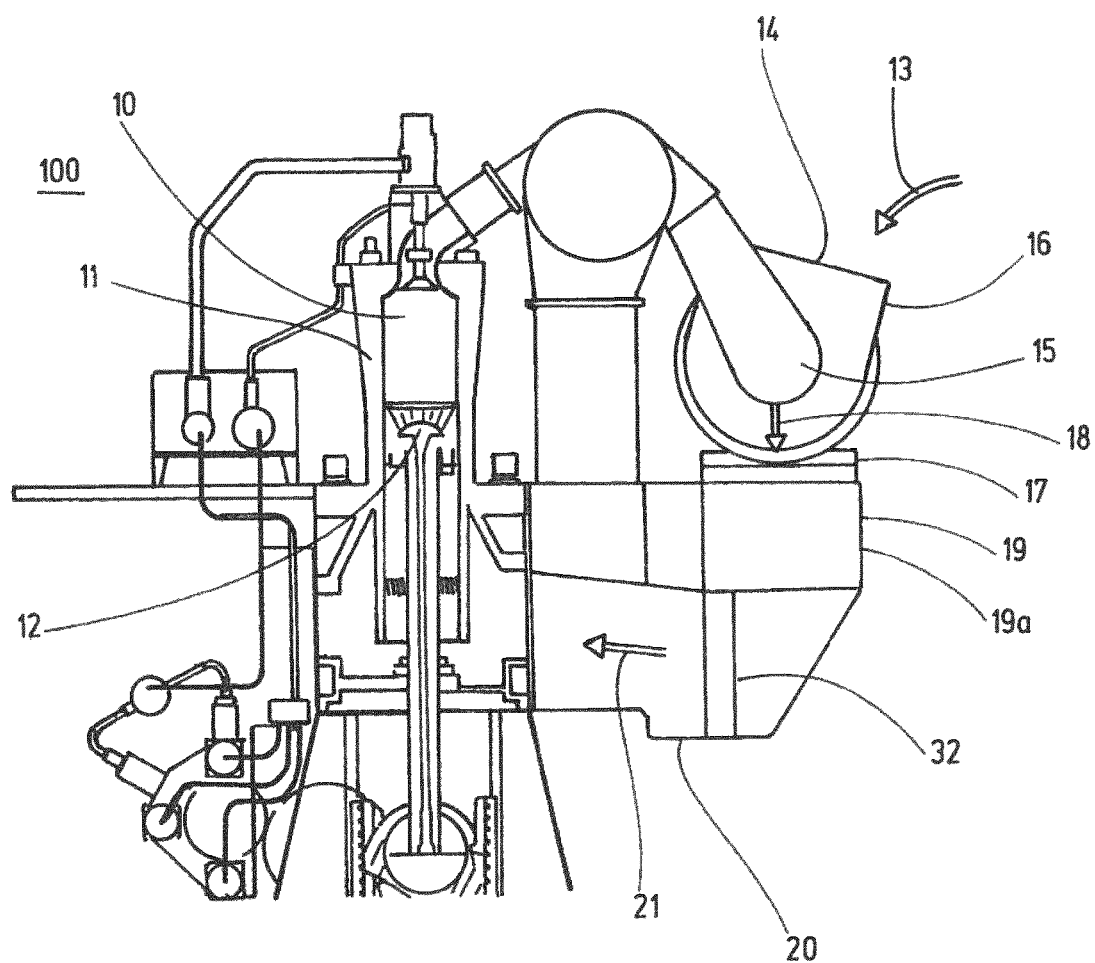
FIG. 1 is a cross-sectional view of a turbocharged engine arrangement.

FIG. 1 shows a turbocharged engine arrangement for a marine vessel in a cross-sectional view. The turbocharged engine arrangement 100 comprises a combustion chamber 10 in a cylinder 11 and a piston 12. A first gas stream 13 of intake air or ambient air or engine room air indicated by an arrow flows into an intake 14 of a turbocharger 15. Between the intake 14 and the turbocharger 15 a first duct 16 is arranged for guiding the first gas stream 13 from the intake 14 to the turbocharger 15. A second duct 17 is arranged to guide a second gas stream 18 of charged air to a charge gas cooler 19a configured as a charge air cooler 19. A third duct 20 connecting the charge air cooler 19 with the combustion chamber 10 guides a third gas stream 21 of charged and cooled air indicated by an arrow from the charge air cooler 19 to the combustion chamber 10. A water catcher 32 is provided in the third duct 20 to drain water vapor condensed from the third gas stream 21. In operation ambient air enters the intake 14 and flows as a first gas stream 13 to the turbocharger 15, where the ambient air is compressed and charged to a high pressure. In the compression process of the intake air or ambient air, the temperature $T_a$ of the intake air is increased. The pressurized and heated ambient air is also called charge air or scavenge air. The charge air is then guided as the second gas stream 18 to the charge air cooler 19, where it is cooled down. Depending on the initial values of temperature $T_a$, pressure $p_a$ and humidity $\varphi_a$ of the ambient air and the operating parameters of the turbocharger 15 and the charge air cooler 19, the humidity of the charge air increases in the charge air cooler 19 and may be saturated so that water vapor starts to condense. The pressurized and cooled down charge air is guided from the charge air cooler 19 as a third gas stream 21 via the third duct 20 and water catcher 32 to the combustion chamber 10.

Figure 2:
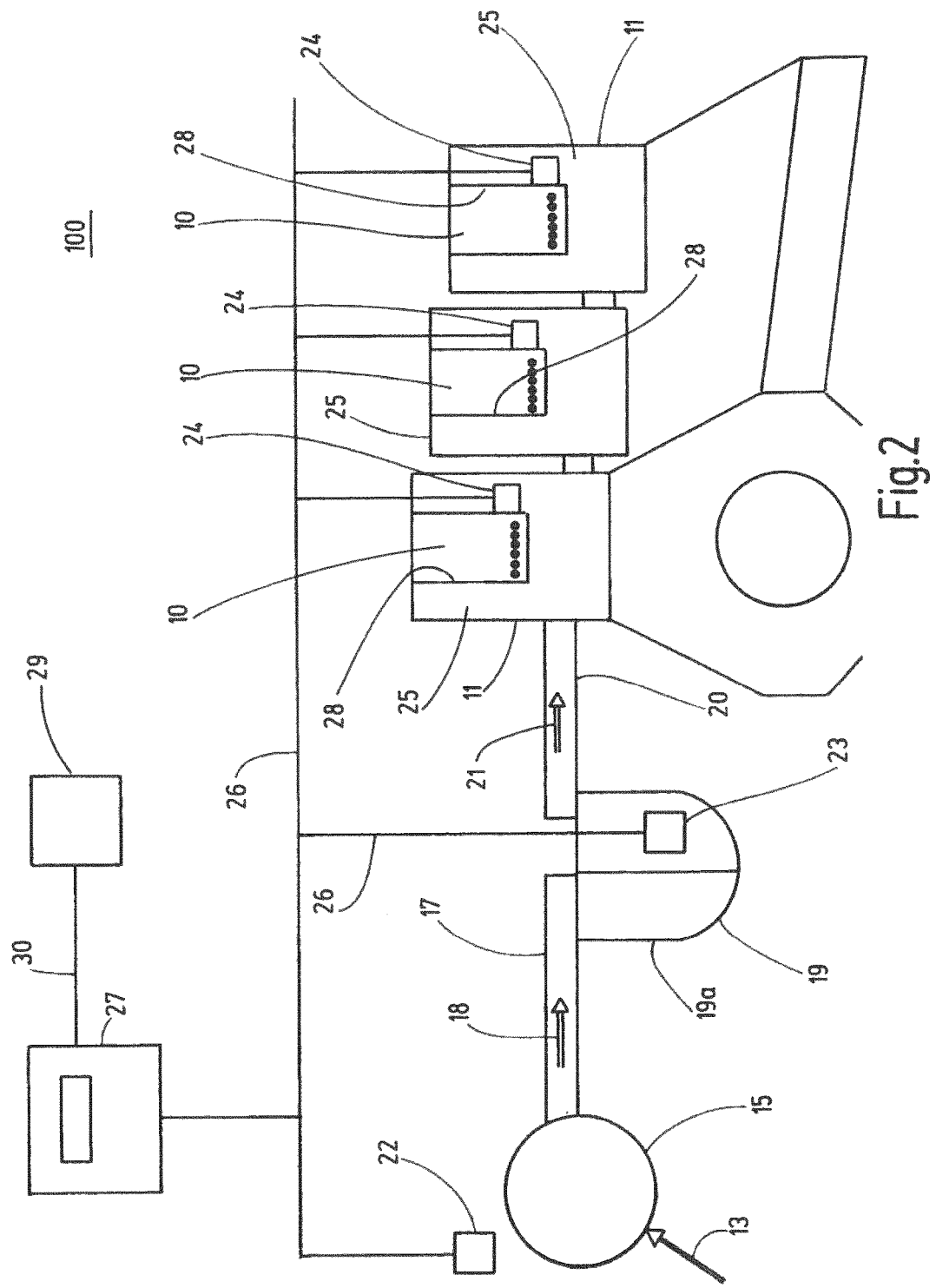
FIG. 2 is another cross-sectional view of a turbocharged engine arrangement.

As shown in FIG. 2, sensors 22, 23, 24 are arranged on or integrated in the turbocharged engine arrangement 100. A first sensor 22 is disposed in the first gas stream 13 of ambient air entering the turbocharger 15, a second sensor 23 is disposed in the third gas stream 21 flowing from the charge air cooler 19 via third duct 20 into the combustion chamber 10 and a third sensor 24 is disposed on or integrated in the liner 25 of a cylinder 11 comprising combustion chamber 10. The first sensor 22 measures the temperature $T_a$, the pressure $p_a$ and the humidity $\varphi_a$ of the ambient air entering the turbocharger 15. The second sensor 23 disposed between the charge air cooler 19 and the combustion chamber, measures the temperature $T_1$, the pressure $p_1$ and the humidity $\varphi_1$ of the pressurized and cooled charge air of the third gas stream 21 flowing from the charge air cooler 19 to the combustion chamber 10. The third sensor 24 is disposed on or integrated in the liner 25 of the cylinder 11 and measures the temperature $T_L$ of the liner 25. Furthermore, the sensor 24 can be configured to also measure the pressure $p_2$ inside the combustion chamber 10.

Figure 3:
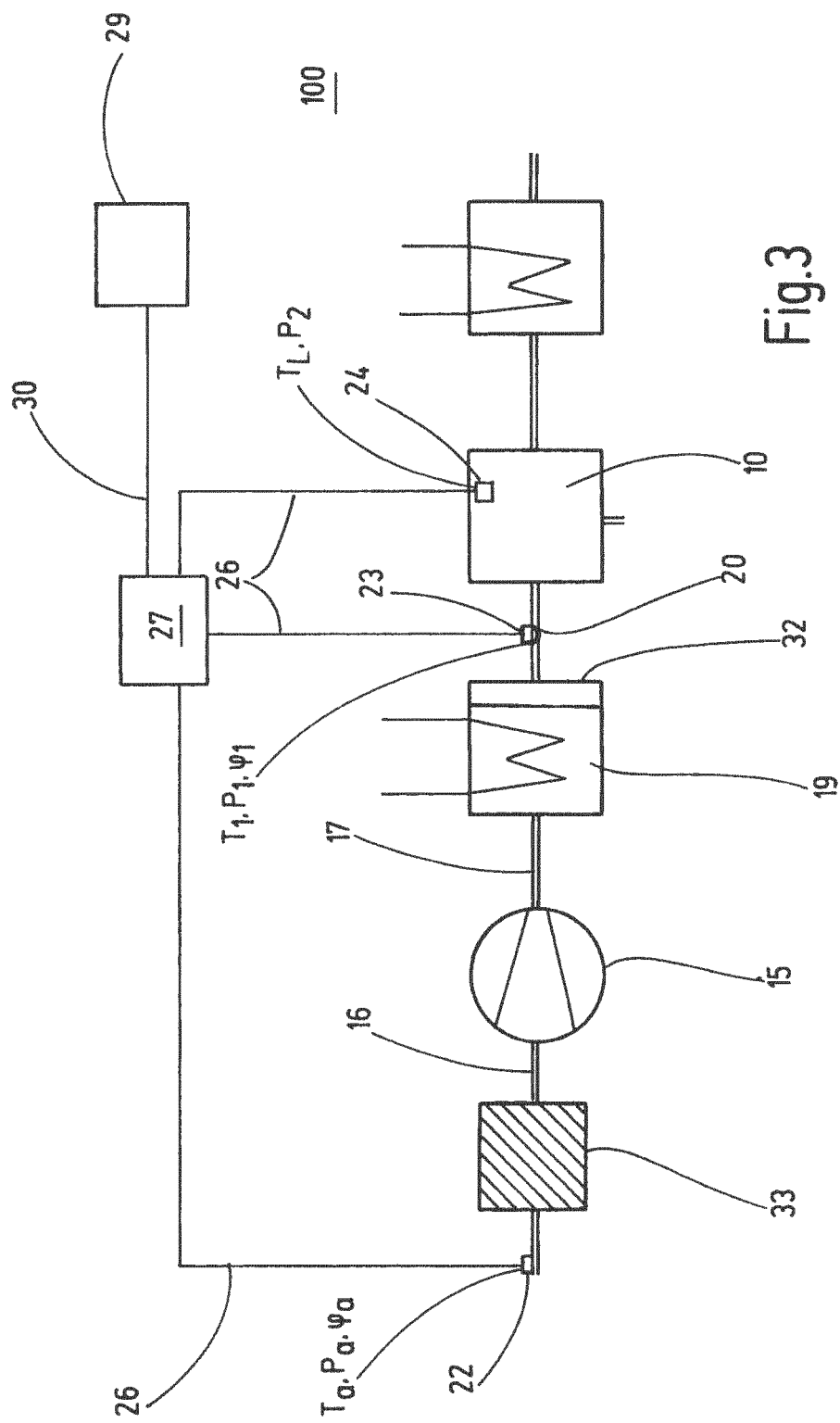
FIG. 3 is a schematic view of a turbocharged engine arrangement.

In FIG. 3 the method of the present invention is shown in a schematic display of the apparatus of the present invention. The first sensor 22 measures the ambient conditions $T_a$, $p_a$, $\varphi_a$, of the intake air, for example an ambient air or an engine room air. The intake air is guided through an intake filter 33 via the first duct 16 into the turbocharger 15, where the intake air is compressed and where the temperature rises due to the compression. The compressed and heated air flows through second duct 17 as the second gas stream 18 into the charge air cooler 19, where depending on the ambient conditions $T_a$, $p_a$ and $\varphi_a$, and the working parameters of the turbocharger 15 and the charge air cooler 19 a mass flow rate of condensate, i.e. an amount of condensed water per time interval, is generated. The condensate is removed from the turbocharged engine arrangement 100 via a water catcher 32. It is possible using thermodynamic relations to calculate the temperature $T_c$, the pressure $p_c$ and the humidity $\varphi_c$ of the cooled down charged air in the third duct 20 guiding a third gas stream 21 from the charge air cooler 19 to the combustion chamber 10. The second sensor 23 measures the humidity $\varphi_1$ of the charge air in the third gas stream 21 flowing from the charge air cooler 19 to the combustion chamber 10. Furthermore, sensor 23 measures the temperature $T_1$ and the pressure $p_1$ of the charge air flowing from the charge air cooler 19 to the combustion chamber 10. This allows for an additional crosscheck between the calculated values of temperature $T_c$, pressure $p_c$ and humidity $\varphi_c$ and the measured values of temperature $T_1$, pressure $p_1$ and humidity $\varphi_1$. For the calculation and crosscheck of the temperature $T_c$, pressure $p_c$ and humidity $\varphi_c$, sensors 22 and 23 transmit the measured values via transmitting means 26 to a processing unit 27, which calculates the temperature $T_c$, the pressure $p_c$ and the humidity $\varphi_c$ of the charge air of the third gas stream 21 flowing from the charge air cooler 19 to the combustion chamber 10. The charge air flows as the third gas stream 21 into the combustion chamber 10 of turbocharged engine arrangement 100 to scavenge the combustion chamber 10 from combustion products or remnants of the previous combustion cycle and to charge the combustion chamber 10 with charge air for the next compression and ignition cycle. Then fuel is injected into the combustion chamber 10 and the fuel air mixture self-ignites. A third sensor 24 measures liner temperature $T_L$ of the liner internal surface 28 of the combustion chamber 10. Furthermore, sensor 24 measures the pressure $p_2$ in the combustion chamber 10. Alternatively, the pressure p inside the combustion chamber 10 may also be calculated via the known compression ratio of the turbocharged engine arrangement 100. Third sensor 24 transmits the measured values of a liner temperature $T_L$ and pressure $p_2$ in combustion chamber 10 to the processing unit 27, which calculates the humidity $\varphi_2$ adjacent to the liner internal surface 28 based on the measured temperature $T_1$ of the third gas stream 21, the measured pressure $p_1$ of the third gas stream, the measured humidity $\varphi_1$ of the charge air in the third gas stream 21 and the liner temperature $T_L$ and the pressure $p_2$ in the combustion chamber 10. When the calculated humidity $\varphi_2$ adjacent to the liner internal surface 28 in the combustion chamber 10 exceeds a predetermined value, for example $\varphi=75\%$, the processing unit 27 transmits a signal to a notification means 29 via transmitting means 30. The notification means 29 is configured as a display showing the risk of corrosion of components of the combustion chamber 10 and, alternatively or additionally, the calculated value of the humidity $\varphi_2$ adjacent to the liner internal surface 28.

An operator or operating person operating the turbocharged engine arrangement 100 may decide based on the indicated risk of corrosion of the components of the combustion chamber 10 and/or the displayed values of the calculated humidity $\varphi$ whether to adjust operating parameters of the turbocharged engine arrangement 100.

Further shown in FIG. 3 is an exhaust gas boiler 31, which is a heat exchanger to convert the combustion heat in the exhaust gases into electric energy.

Figure 4:
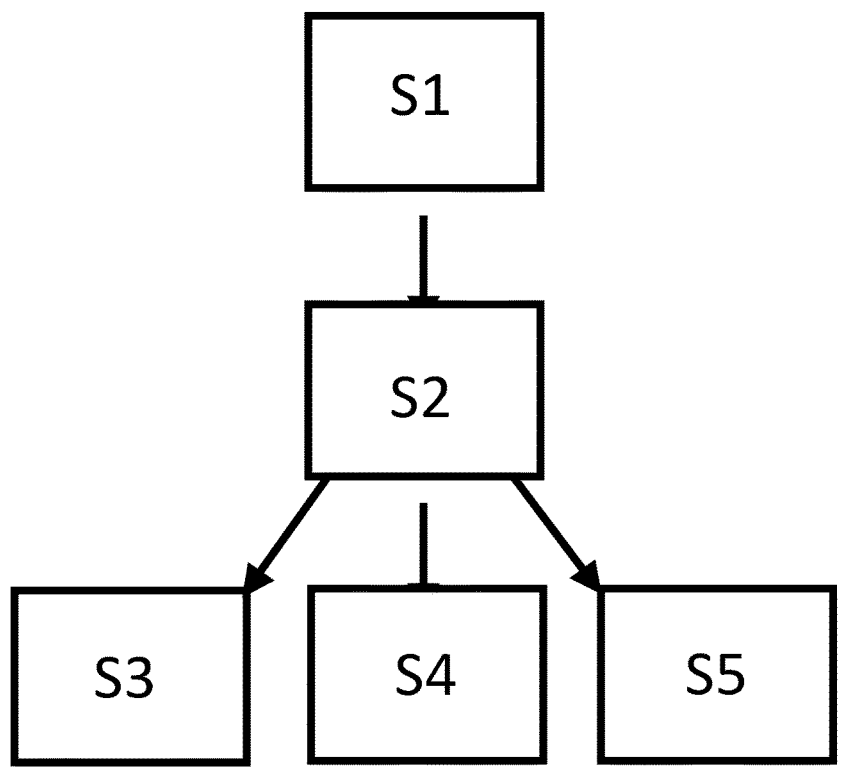
FIG. 4 is a flowchart illustrating a method for indicating a risk of corrosion or scuffing of components of a combustion chamber of a turbocharged engine arrangement.

FIG. 4 shows a method for indicating a risk of corrosion or scuffing of components of a combustion chamber of a turbocharged engine arrangement 100, in particular for vessels, wherein the turbocharged engine arrangement 100 comprises a turbocharger 15 and a charge gas cooler as shown in FIGS. 1 to 3.

In the turbocharged engine arrangement 100 a first gas stream 13 of an ambient gas enters into the turbocharger 15, a second gas stream 18 of charge gas flows from the turbocharger 15 to the charge gas cooler 19a, the second gas stream 18 of charge gas enters into the charge gas cooler 19a and a third gas stream 21 of charge gas flows from the charge gas cooler 19a to the combustion chamber 10. Furthermore, the third gas stream 21 of charge gas enters into the combustion chamber 10.

The method comprises in a first step S1 the step of measuring parameters, wherein the measured parameters comprise at least one gas temperature, at least one gas pressure, a first water content of the charge gas of the third gas stream and a liner temperature of a liner 25 of the combustion chamber 10. The measured gas temperature may be the temperature $T_a$ of the first gas stream 13 of ambient gas. The at least one gas pressure may be the pressure $p_a$ of the first gas stream 13 of ambient gas. In addition the water content $\phi_a$ of the first gas stream 13 of ambient gas may be measured.

In a second step S2 a second water content $\phi_2$ of a gas in the combustion chamber 10 is determined, in particular calculated, based on the measured parameters.

In a third step S3 the determined second water content $\phi_2$ is indicated as an indicator of the risk of corrosion or scuffing of components of the combustion chamber 10.

Alternatively or additionally to step S3 in step S4 the determined second water content $\phi_2$ is compared with at least one predetermined value and the risk of corrosion of components or scuffing of the combustion chamber 10 is indicated when the determined second water content $\phi_2$ is higher or equal than the at least one predetermined value.

Still further in addition or as an alternative to steps S3 and S4 in step S5 an operating parameter of the turbocharged engine arrangement 100 is adjusted. The operating parameter may be the liner temperature $T_L$, which may be adjusted by adjusting the temperature of cooling fluid of a liner cooling system.

The invention claimed is:

1. A method for indicating a risk of corrosion or scuffing of components of a combustion chamber of a turbo charged engine arrangement, in particular for vessels, wherein the turbo charged engine arrangement comprises a turbocharger and a charge gas cooler, wherein a first gas stream of an ambient gas enters into the turbocharger, wherein a second gas stream of charge gas flows from the turbocharger to the charge gas cooler, wherein the second gas stream of charge gas enters into the charge gas cooler, wherein a third gas stream of charge gas flows from the charge gas cooler to the combustion chamber, and wherein the third gas stream of charge gas enters into the combustion chamber, comprising the steps of:
  a) measuring parameters, wherein the measured parameters comprise at least one gas temperature, at least one gas pressure, a first water content of the charge gas of the third gas stream and a liner temperature of a liner of the combustion chamber, and
  b) determining, in particular calculating, a second water content of a gas in the combustion chamber based on the measured parameters, and
  at least one of:
   c1) indicating the determined second water content as an indicator of the risk of corrosion or scuffing of components of the combustion chamber,
   c2) comparing the determined second water content with at least one pre-determined value and indicating the risk of corrosion of components or scuffing of the combustion chamber when the determined second water content is higher than or equal to the at least one pre-determined value,
   c3) adjusting an operating parameter of the turbo charged engine.

2. The method according to claim 1, wherein the at least one temperature is at least one of a temperature of the first gas stream of ambient gas, a temperature of the second gas stream of charge gas, and a temperature of the third gas stream of charge gas, and/or wherein the at least one gas pressure is at least one of a pressure of the first gas stream of ambient gas, a pressure of the second gas stream of charge gas a pressure of the third gas stream of charge gas, and a pressure of the gas in the combustion chamber.

3. The method according to claim 1, wherein the ambient gas of the first gas stream is ambient air and/or wherein the charge gas of the second gas stream is charge air and/or wherein the charge gas of the third gas stream is charge air and/or wherein the gas in the combustion chamber is a charge gas, in particular charge air, or a gas fuel mixture, in particular an air fuel mixture.

4. The method according to claim 1, wherein a third water content of a gas is measured, wherein the third water content is at least one of a water content of the first gas stream of ambient gas and a water content of the second gas stream of charge gas.

5. The method according to claim 1, wherein the operating parameter of the turbo charged engine arrangement is at least one of the liner temperature of the liner, the temperature of the third gas stream of charge gas, a lubrication rate of the components of the combustion chamber with a lubricant, the alkalinity of the lubricant, and the charge gas pressure of the turbocharger.

6. The method according to claim 1, wherein the liner temperature is adjusted by adjusting the temperature of cooling fluid of a liner cooling system.

7. Apparatus for indicating a risk of corrosion or scuffing of components of a combustion chamber of a turbo charged engine arrangement, in particular for vessels, wherein the turbo charged engine arrangement comprises a turbocharger and a charge gas cooler, said apparatus comprising a processing unit and at least one sensor for measuring parameters, said parameters comprising a first water content of a charge gas of a third gas stream flowing from the charge gas cooler to the combustion chamber, at least one gas temperature and at least one gas pressure,
  characterized in that
  the at least one sensor comprises a sensor for measuring a liner temperature of a liner of the combustion chamber,
  the processing unit is configured for determining, in particular calculating, a second water content of a gas in the combustion chamber based on the parameters measured by the at least one sensor and that the processing unit is configured for comparing the determined second water content with at least one predetermined value,
  the apparatus comprises at least one of:
   notification means for indicating at least one of the determined second water content as an indicator of the risk of corrosion or scuffing of components of the combustion chamber, the risk of corrosion or scuffing of components of the combustion chamber when the determined second water content is higher than or equal to the at least one pre-determined value, and
   adjusting means for adjusting an operating parameter of the turbo charged engine arrangement.

8. The apparatus according to claim 7, wherein the at least one temperature is a temperature of a first gas stream of ambient gas entering the turbocharger and a temperature of a second gas stream of charge gas flowing from the turbocharger to the charge gas cooler and a temperature of the third gas stream of charge gas, and/or wherein the at least one gas pressure is a pressure of the first gas stream of ambient gas and/or a pressure of the second gas stream of charge gas and/or a pressure of the third gas stream of charge gas and/or a pressure of the gas in the combustion chamber.

9. The apparatus according to claim 7, wherein the ambient gas of the first gas stream is ambient air and/or wherein the charge gas of the second gas stream is charge air and/or wherein the charge gas of the third gas stream is charge air and/or wherein the gas in the combustion chamber is a charge gas, in particular charge air or a gas fuel mixture, in particular an air fuel mixture.

10. The apparatus according to claim 7, wherein the adjusting means are configured to adjust the liner temperature, and/or the temperature of the third gas stream of charge gas, and/or a lubrication rate of the components of the combustion chamber with a lubricant, and/or the alkalinity of the lubricant and/or the charge gas pressure of the turbocharger.

11. The apparatus according to claim 7, comprising a liner cooling system, wherein the adjusting means are configured for adjusting the temperature of cooling fluid of the liner cooling system.

12. A turbocharged engine arrangement comprising the apparatus according to claim 7.

* * * * *